(12) United States Patent
Yang et al.

(10) Patent No.: US 10,840,986 B2
(45) Date of Patent: Nov. 17, 2020

(54) ENHANCED TYPE II CHANNEL STATE INFORMATION IN MOBILE COMMUNICATIONS

(71) Applicant: MediaTek Inc., Hsinchu (TW)

(72) Inventors: Weidong Yang, San Diego, CA (US); Chao-Cheng Su, Hsinchu (TW); Tzu-Han Chou, San Jose, CA (US)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/579,829

(22) Filed: Sep. 24, 2019

(65) Prior Publication Data

US 2020/0106503 A1 Apr. 2, 2020

Related U.S. Application Data

(60) Provisional application No. 62/738,021, filed on Sep. 28, 2018, provisional application No. 62/739,905, filed on Oct. 2, 2018.

(51) Int. Cl.
| | |
|---|---|
| *H04L 5/00* | (2006.01) |
| *H04B 7/06* | (2006.01) |
| *H04B 7/0456* | (2017.01) |

(52) U.S. Cl.
CPC ......... *H04B 7/0626* (2013.01); *H04B 7/0456* (2013.01); *H04B 7/0695* (2013.01); *H04L 5/0048* (2013.01)

(58) Field of Classification Search
USPC ....................................................... 375/262
See application file for complete search history.

(56) References Cited

U.S. PATENT DOCUMENTS

| | | | | |
|---|---|---|---|---|
| 10,505,600 | B2 * | 12/2019 | Faxer .................. | H04B 7/0617 |
| 2017/0257884 | A1 | 9/2017 | Rahman et al. | |
| 2018/0048375 | A1 * | 2/2018 | Guo ...................... | H04B 7/024 |
| 2019/0068258 | A1 * | 2/2019 | Oteri .................... | H04B 7/0617 |
| 2019/0245595 | A1 * | 8/2019 | Xu ........................ | H04B 7/0639 |
| 2019/0363774 | A1 * | 11/2019 | Mao ..................... | H04B 7/0417 |
| 2020/0091975 | A1 * | 3/2020 | Park .................... | H04B 7/0478 |

OTHER PUBLICATIONS

China National Intellectual Property Administration, International Search Report and Written Opinion for PCT/CN2019/108365, dated Dec. 27, 2019.

(Continued)

*Primary Examiner* — Eva Y Puente
(74) *Attorney, Agent, or Firm* — Han IP PLLC; Andy M. Han

(57) ABSTRACT

Techniques and examples pertaining to enhanced Type II channel state information (CSI) in mobile communications are described. A user equipment (UE) receives, from a network node of a wireless network, one or more reference signals via a communication link between the UE and the network node. The UE constructs a precoder such that a number of selected beams for a plurality of delay taps is reduced. The UE also constructs a linear combination-based CSI feedback by utilizing the precoder such that overhead in the CSI feedback is reduced compared to a case in which the number of selected beams for the plurality of delay taps is not reduced. The UE then transmits the CSI feedback to the network node.

16 Claims, 6 Drawing Sheets

(56) References Cited

OTHER PUBLICATIONS

Huawei et al., Design for Type II Feedback, 3GPP TSG RAN WG1 Meeting #88, R1-1703344, Athens, Greece, Feb. 13-17, 2017.
LG Electronics, Discussion on CSI feedback Type II, 3GPP TSG RANWG1 Meeting #88bis, R1-1704884, Spokane, USA, Apr. 3-7, 2017.
Samsung et al., WF on Type I and II CSI codebooks, 3GPP TSG-RAN WG1 #89, R1-1709232, Hangzhou, China, May 15-19, 2017.
Mediatek Inc., CSI enhancement for MU-MIMO support, 3GPP TSG RAN WG1 Meeting #91, R1-1810433, Chengdu, China, Oct. 10-12, 2018.

* cited by examiner

ENHANCED TYPE II CHANNEL STATE INFORMATION IN MOBILE COMMUNICATIONS

CROSS REFERENCE TO RELATED PATENT APPLICATION

The present disclosure is part of a non-provisional patent application that claims the priority benefit of U.S. Provisional Patent Application No. 62/738,021, filed 28 Sep. 2018, and U.S. Provisional Patent Application No. 62/739,905, filed 2 Oct. 2018. Contents of above-listed applications are herein incorporated by reference in their entirety.

TECHNICAL FIELD

The present disclosure is generally related to mobile communications and, more particularly, to enhanced Type II channel state information (CSI) in mobile communications.

BACKGROUND

Unless otherwise indicated herein, approaches described in this section are not prior art to the claims listed below and are not admitted as prior art by inclusion in this section.

In release 15 (Rel-15) of the $3^{rd}$ Generation Partnership Project (3GPP) specification, two types of channel CSI feedback schemes, namely Type I and Type II, have been defined for $5^{th}$ Generation (5G) New Radio (NR) networks. In Type I of CSI feedback, the conventional dual codebook structure is enforced. Type II of CSI feedback targets high-resolution CSI acquisition for multi-user multiple-input-and-multiple-output (MU-MIMO) operations, and a linear combination codebook is assumed for Type II CSI feedback. There are three categories under Type II, namely Category I, Category II and Category Ill. With Category I, a linear combination (LC) codebook is assumed.

While Type II CSI feedback is intended to provide significant performance gain over legacy Long-Term Evolution (LTE) codebooks, such gain tends to come at the expense of a significant increase in uplink (UL) overhead. There is, therefore, a need for overhead reduction for Type II CSI.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions and schemes to reduce overhead for Type II CSI.

In one aspect, a method may involve a processor of a user equipment (UE) receiving, from a network node of a wireless network, one or more reference signals via a communication link between the UE and the network node. The method may also involve the processor constructing a precoder such that a number of selected beams for a plurality of delay taps is reduced. The method may further involve the processor constructing a linear combination-based CSI feedback by utilizing the precoder such that overhead in the CSI feedback is reduced compared to a case in which the number of selected beams for the plurality of delay taps is not reduced. The method may additionally involve the processor transmitting the CSI feedback to the network node.

In one aspect, an apparatus implemented in a UE may include a transceiver and a processor coupled to the transceiver. The transceiver may be configured to wirelessly communicate with a network node of a wireless network. The processor may be configured to perform operations including: (i) receiving, via the transceiver, from the network node one or more reference signals via a communication link between the UE and the network node; (ii) constructing a precoder such that a number of selected beams for a plurality of delay taps is reduced; (iii) constructing a linear combination-based CSI feedback by utilizing the precoder such that overhead in the CSI feedback is reduced compared to a case in which the number of selected beams for the plurality of delay taps is not reduced; and (iv) transmitting, via the transceiver, the CSI feedback to the network node.

It is noteworthy that, although description of the proposed scheme and various examples is provided below in the context of 5G/NR wireless communications, the proposed concepts, schemes and any variation(s)/derivative(s) thereof may be implemented in communications in accordance with other protocols, standards and specifications where implementation is suitable such as, for example and without limitation, LTE, LTE-Advanced, LTE-Advanced Pro, Internet of Things (IoT), narrowband IoT (NB-IoT), and any future-developed networks and technologies. Thus, the scope of the proposed scheme is not limited to the description provided herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
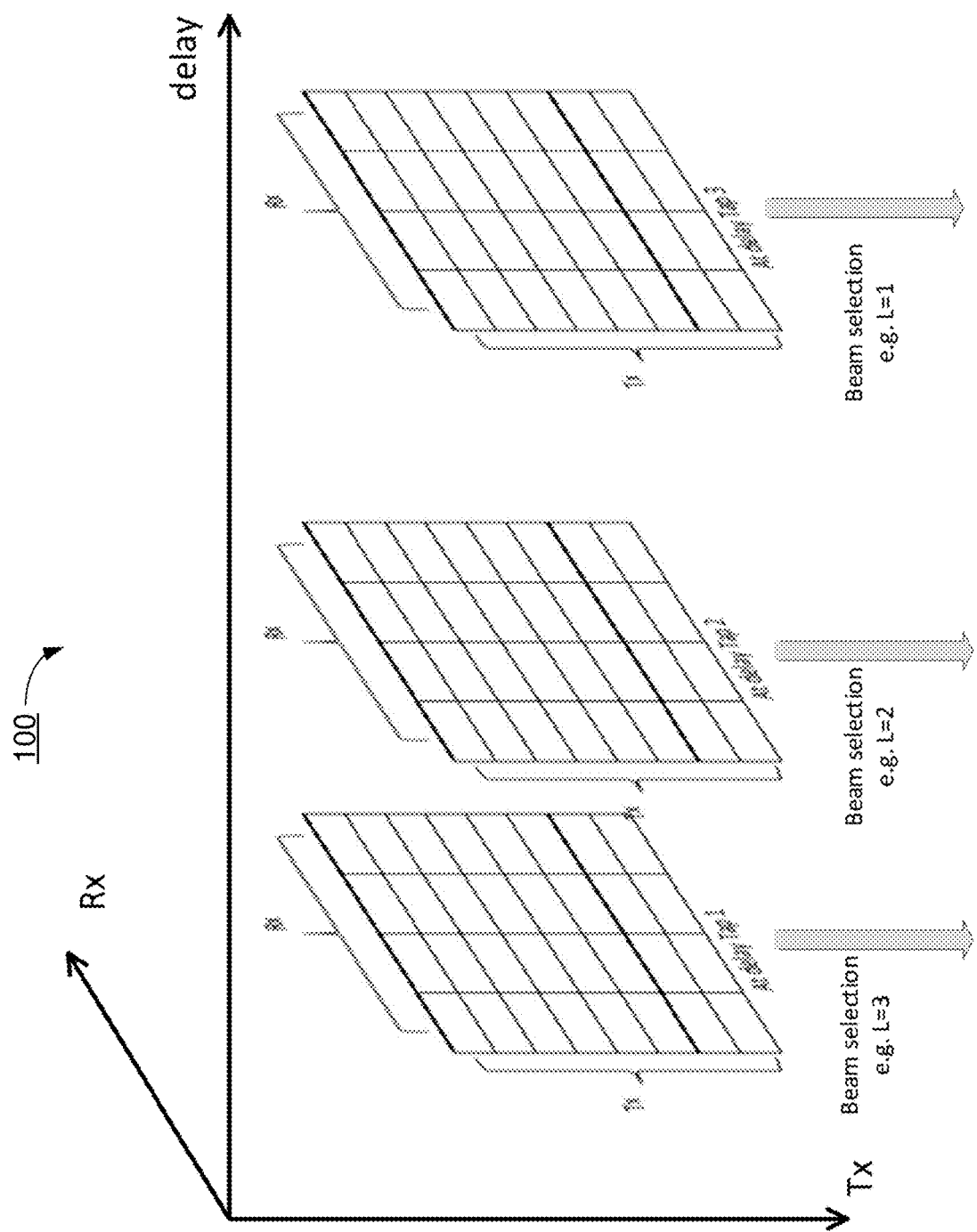
FIG. 1 is a diagram of an example scenario in which various proposed schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhanced Type II CSI in mobile communications. According to the present disclosure, a number of possible solutions may be implemented separately or jointly. That is, although these possible solutions may be described below separately, two or more of these possible solutions may be implemented in one combination or another.

In 3GPP, Type II codebooks with linear combinations have been agreed for rank 1 and rank 2. However, the CSI feedback overhead with Type II codebooks is substantial. There are some observations which can be drawn on Rel-15 Type II CSI feedback. Firstly, the feedback overhead heavily depends on the value of L (the number of two-dimensional (2D) Discrete Fourier Transform (DFT) beams). Secondly, the feedback overhead heavily depends on the selected rank. Thirdly, the feedback overhead increases almost linearly with the number of subbands in the feedback. Moreover, even though the amplitude distributions associated with the second strongest, the third strongest beam or a next strongest beam can be very different, using the same amplitude quantization (e.g., $\{1, \sqrt{0.5}, \sqrt{0.25}, \sqrt{0.125}, \sqrt{0.0625}, \sqrt{0.0313}, \sqrt{0.0156}, 0\}$ for wideband and $\{1, \sqrt{0.5}\}$ for subband), and the amplitude quantization in Rel-15 does take advantage of different amplitude distributions of coefficients with different beams. Furthermore, except for the wideband beam selection and wideband power, for the Type II codebook defined in Rel-15, the parameterization of precoders is conducted at a per-subband basis, without exploiting the correlation across subbands.

On another note, under 3GPP, it has been decided that the number of subbands for CSI feedback is upper-bounded by 18. Considering up to 275 physical resource blocks (PRBs) may be included in a bandwidth part (BWP), one subband may contain up to 16 PRBs. Obtaining finer precoder resolution in the frequency domain in this case may be desired (e.g., for better MU-MIMO pairing) but unachievable, as the feedback overhead with 18 subbands is quite large already. Increasing the CSI resolution following the same approach taken in Rel-15 would make the situation even worse.

In view of the above, the present disclosure aims to propose various schemes to exploit channel correlation in the frequency domain (and hence precoder correlation in the frequency domain) so as to reduce feedback overhead. FIG. 1 illustrates an example scenario 100 in which various proposed schemes in accordance with the present disclosure may be implemented. Referring to FIG. 1, scenario 100 involves a time domain channel response between a base station and a user equipment (UE). In scenario 100, only the delay taps with significant power are selected/kept while other taps with insignificant contribution to the channel composition are discarded. In FIG. 1, three delay taps are shown. At each delay tap, the channel response is an M×N matrix, with M being the number of transmitting (TX) antenna ports and N being the number of receiving (RX) antenna ports.

A beam basis consisting of orthogonal 2D DFT beams may be chosen at a given $(o_1, o_2)$, $0 \leq o_1 \leq O_1-1$, $0 \leq o_2 \leq O_2-1$, where $O_1$ and $O_2$ are the oversampling factors. At each tap, as the clusters/paths contribute significantly to that tap may not have directions of arrival (DoAs) covering all the beam basis vectors of the selected beam basis, using only a subset of the beam basis may be sufficient to capture most of the power of the channel response at that tap. Using fewer beam basis vectors at a tap may lead to feedback overhead reduction. In one perspective, the user of a larger L may be permissible as the per-tap overhead may be small.

Accordingly, under a proposed scheme in accordance with the present disclosure, a rank R precoder at frequency f may be constructed as follows:

$$\sum_{d=1}^{D} e^{j2\pi f \tau_d} \times B \times S_d \times P_d$$

Here, D denotes the number of delay taps included in the CSI feedback, with tap delay values $\{(\tau_1, \tau_2, \ldots, \tau_D)\}$. With $b_1, \ldots, b_L$ from orthogonal 2D DFT beams at a given $(o_1, o_2)$, $0 \leq o_1 \leq O_1-1$, $0 \leq o_2 \leq O_2-1$, the selected beam basis for all D delay taps may be expressed as follows:

$$B_{M \times 2L} = \begin{bmatrix} b_1 & \ldots & b_L & 0 & \ldots & 0 \\ 0 & \ldots & 0 & b_1 & \ldots & b_L \end{bmatrix}$$

Here, $S_d$ denotes a $2L \times L_d$ beam selection matrix at tap d, with $S_d$ having elements from "1" and "0" and with a single "1" in each column and no more than one "1" in each row. Additionally, $L_d$ denotes the number of selected beam basis vectors at delay tap d. Moreover, $P_d$ denotes an $L_d \times R$ matrix for delay tap d. Furthermore, coefficient amplitude quantization may adapt to the strength of the associated beam.

Moreover, under a proposed scheme in accordance with the present disclosure, the following codebook design for overhead reduction for NR release 16 (Rel-16) may be considered at frequency index f.

For rank 1:

$$(f) = \begin{bmatrix} \tilde{w}_{0,0,f} \\ \tilde{w}_{1,0,f} \end{bmatrix}$$

For rank ≥2 (with the rank be denoted as A):

$$W(f) = \begin{bmatrix} \tilde{w}_{0,0,f} & \ldots & \tilde{w}_{0,A-1,f} \\ \tilde{w}_{1,0,f} & \ldots & \tilde{w}_{1,A-1,f} \end{bmatrix}$$

$$w_{r,l,d} = \sum_{i=0}^{L_d-1} b_{k_{1,d}^{(i)} k_{2,d}^{(i)}} \cdot p_{r,l,i,d} \cdot c_{r,l,i,d}$$

In the above expressions, r=0, 1, l=0, A−1, 1≤d≤D, and $$b_{k_{1,d}^{(i)} k_{2,d}^{(i)}}$$

denotes an oversampled 2D DFT beam. Also, $$\tilde{w}_{r,l,f} = \sum_{d=1}^{D} w_{r,l,d} e^{2\pi \cdot \Delta \cdot f \cdot l_d}.$$

In the above expressions, r=0, 1 (polarization index), l=0, ..., A−1 (layer index), $I_d$ denotes an integer taking values in a range of $0 \le I_d \le I_{max}$, d=0, ..., D−1, D denotes the number of delay taps, $I_{d_1} \ne I_{d_2}$ in an event that $d_1 \ne d_2$, and $\Delta$ denotes the delay tap step. Under the proposed scheme, either of $\Delta$ and $I_{max}$ may be configurable, specified, or determined by the UE.

In the above expressions, $p_{r,l,i,d}$ denotes the amplitude at polarization r, beam l, spatial layer i, and delay tap d. Additionally, $c_{r,l,i,d}$ denotes the phase coefficient at polarization r, beam l, spatial layer i, and delay tap d. A delay tap power for delay tap d may be defined as follows:

$$P_d = \sum_{r=0}^{1} \sum_{l=0}^{A-1} \|w_{r,l,d}\|^2.$$

In the above expressions, $L_d$ (with a value ≥1) denotes the number of beams at delay tap d. Under the proposed scheme, beam selection may be different for different delay taps, including the number of beams. That is, the number of spatial beams at a given delay tap may vary with the corresponding tap index. In the present disclosure, the sequence $[L_1, ..., L_D]$ is referred to as the beam number profile. The beam number profile may be specified, configured by the network, or determined by the UE. In an event that the beam number profile is determined by the UE, $P_d$ may be used. For example, for a tap with a large $P_d$, more beams may be used than for a tap with a smaller $P_d$. Under the proposed scheme, $L_d$ may be related to the angular spread at tap d, although quantization error between feedback without quantization and that with quantization may also contribute to the selection of $L_d$.

Under the proposed scheme, a combinatorial index similar to the beam selection signaling for NR Rel-15 Type II may be used to encode $I_d$, 1≤d≤D to save on signaling overhead. Alternatively, instead of jointly encoding all $I_d$, d=1, ..., D, $I_d$ may be divided into a plurality of groups (e.g., $g_1, g_2, ...$) so that $I_d$ in a lower-indexed group (e.g., $g_1$) has a higher $P_d$ than $I_d$ in a higher-indexed group (e.g., $g_2$). In this case, the group index may indicate the delay tap power ranking among groups. Under the proposed scheme, all $I_d$ in a group may be encoded jointly, and separate encoding may be executed for each group.

Under the proposed scheme, the quantization resolution of $P_{r,l,i,d}$ may depend on the group index (or delay tap power ranking) such as, for example and without limitation, for delay tap d with $I_d$ included into $g_1$, using two bits, and for delay tap d with $I_d$ included into $g_2$, using a single bit. Under the proposed scheme, the quantization resolution of may depend on the group index (or delay tap power ranking) such as, for example and without limitation, for delay tap d with $I_d$ included into $g_1$, using eight phase-shift keying (8PSK), and for delay tap d with $I_d$ included into $g_2$, using quadrature phase-shift keying (QPSK).

Under the proposed scheme, any of D, the beam number profile, $\Delta$ and $I_{max}$ may have dependence on the feedback rank A. For instance, for rank 1 (e.g., A=1), D may tend to be small, and $I_{max}$ may tend to be small too.

Figure 2:
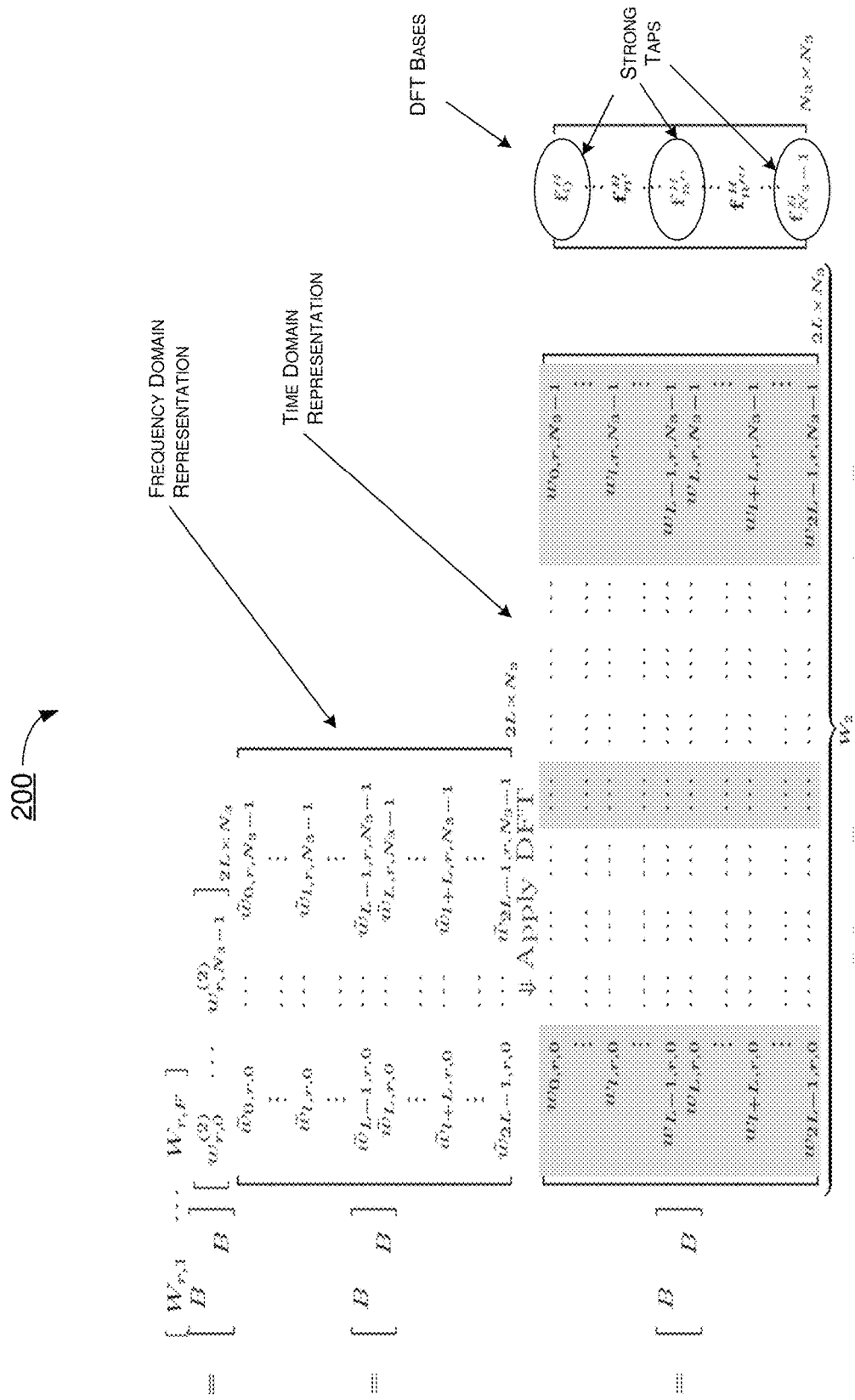
FIG. 2 is a diagram of an example stage of precoder construction in accordance with an implementation of the present disclosure.
Figure 3:
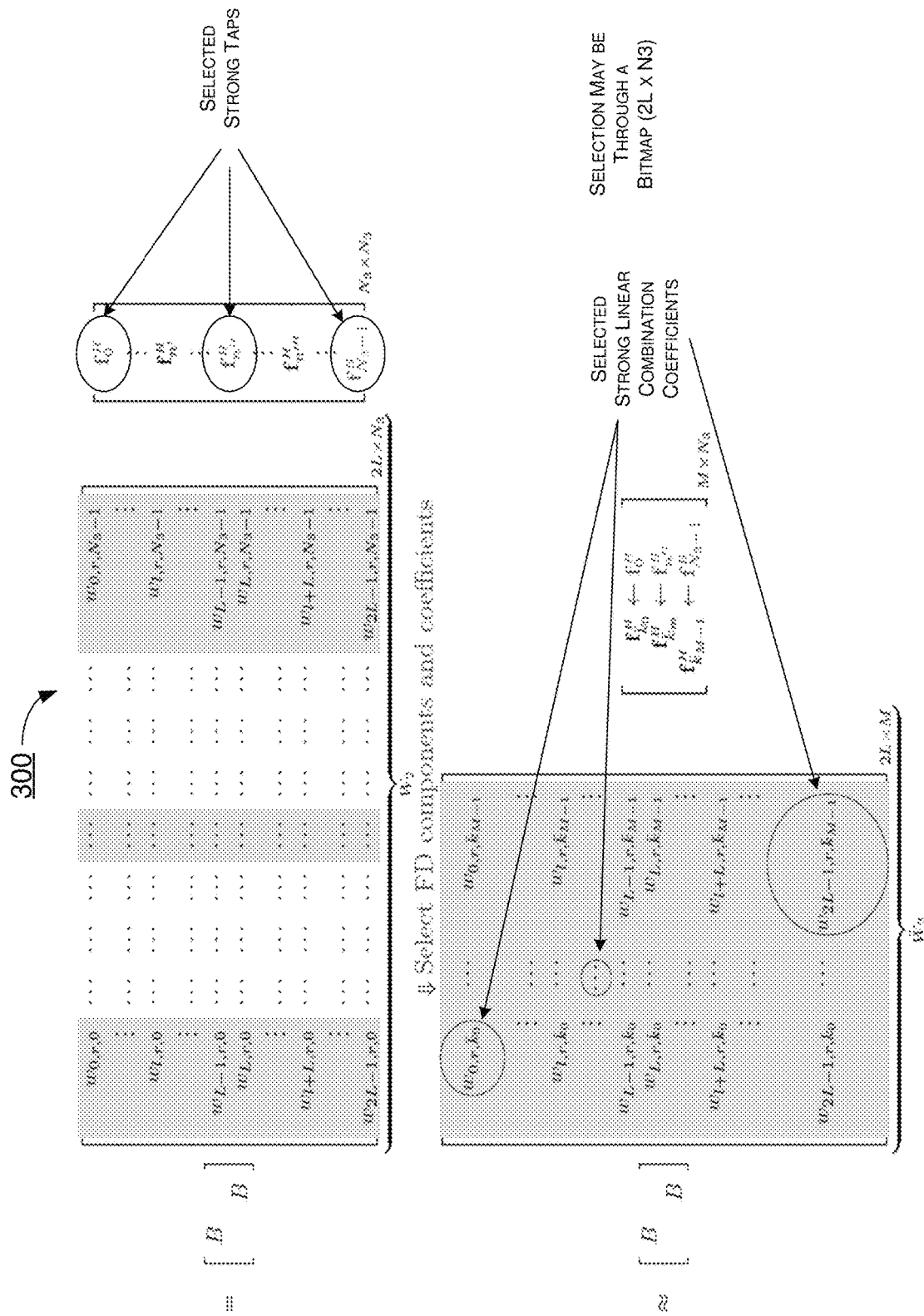
FIG. 3 is a diagram of an example stage of precoder construction in accordance with an implementation of the present disclosure.
Figure 4:
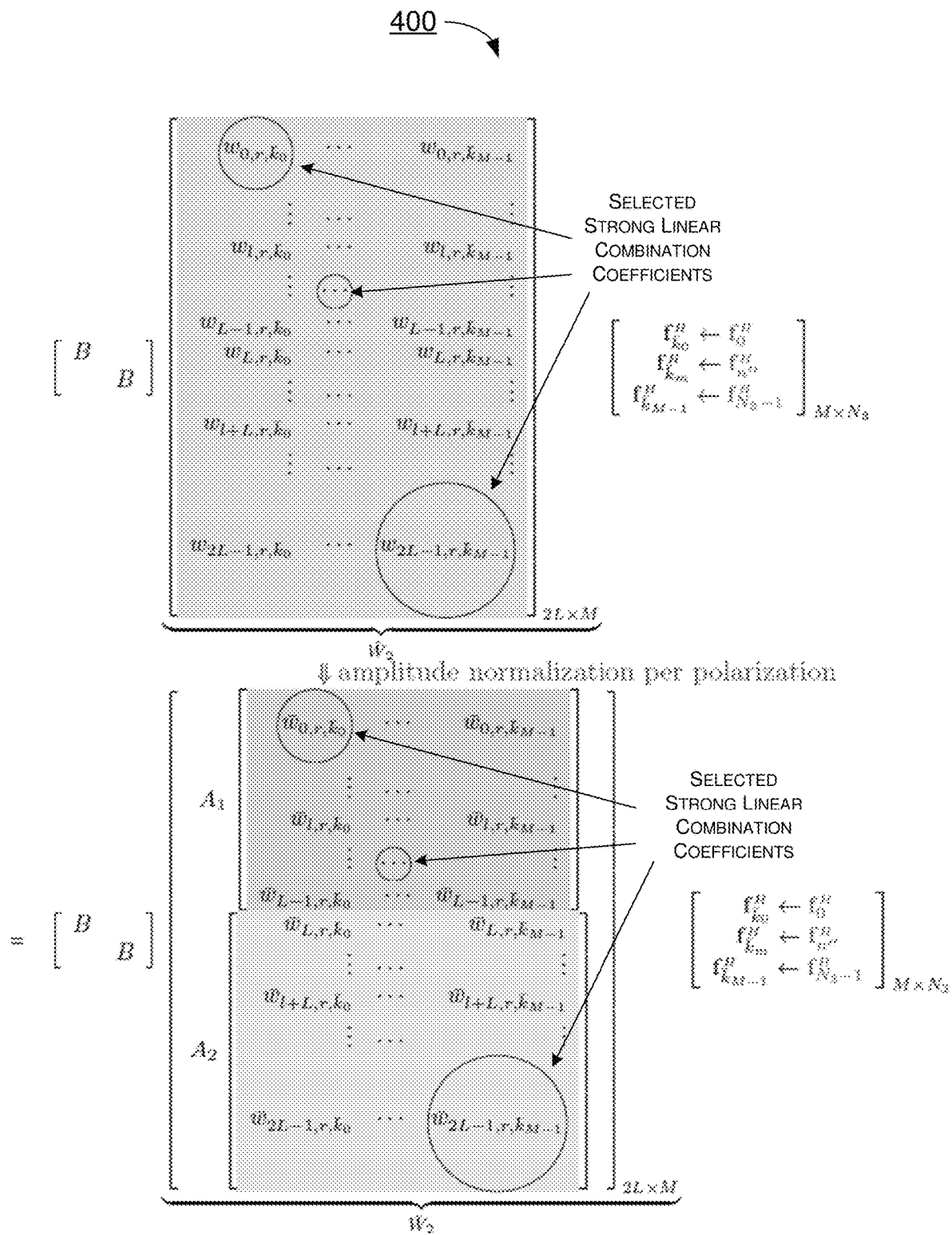
FIG. 4 is a diagram of an example stage of precoder construction in accordance with an implementation of the present disclosure.

In view of the present disclosure, an illustrative and non-limiting example of precoder construction for overhead reduction in CSI feedback for Type II CSI is described below and shown in FIG. 2~FIG. 4. Specifically, FIG. 2 illustrates an example stage 200 of precoder construction in accordance with an implementation of the present disclosure. FIG. 3 illustrates an example stage 300 of precoder construction in accordance with an implementation of the present disclosure. FIG. 4 illustrates an example stage 400 of precoder construction in accordance with an implementation of the present disclosure. The precoder thus constructed may be used to construct a CSI feedback such that overhead in the CSI feedback is reduced compared to a case in which the number of selected beams for the plurality of delay taps is not reduced.

Referring to FIG. 2, in scenario 200, a frequency-domain representation of a plurality of beams of a plurality of delay taps may be converted into a time-domain representation of the plurality of beams at each delay tap using DFT. Referring to FIG. 3, in scenario 300, one or more strong taps may be selected from a plurality of delay taps, based on a time-domain component thereof. Similarly, one or more strong linear combination coefficients may be selected from a plurality of linear combination coefficients. The selection may be performed through a bitmap (e.g., a 2L×N3 bitmap in the example shown in FIG. 2~FIG. 4). Referring to FIG. 4, in scenario 400, amplitude quantization of the selected one or more strong linear combination coefficients may be performed to result in amplitude normalization per polarization.

Illustrative Implementations

Figure 5:
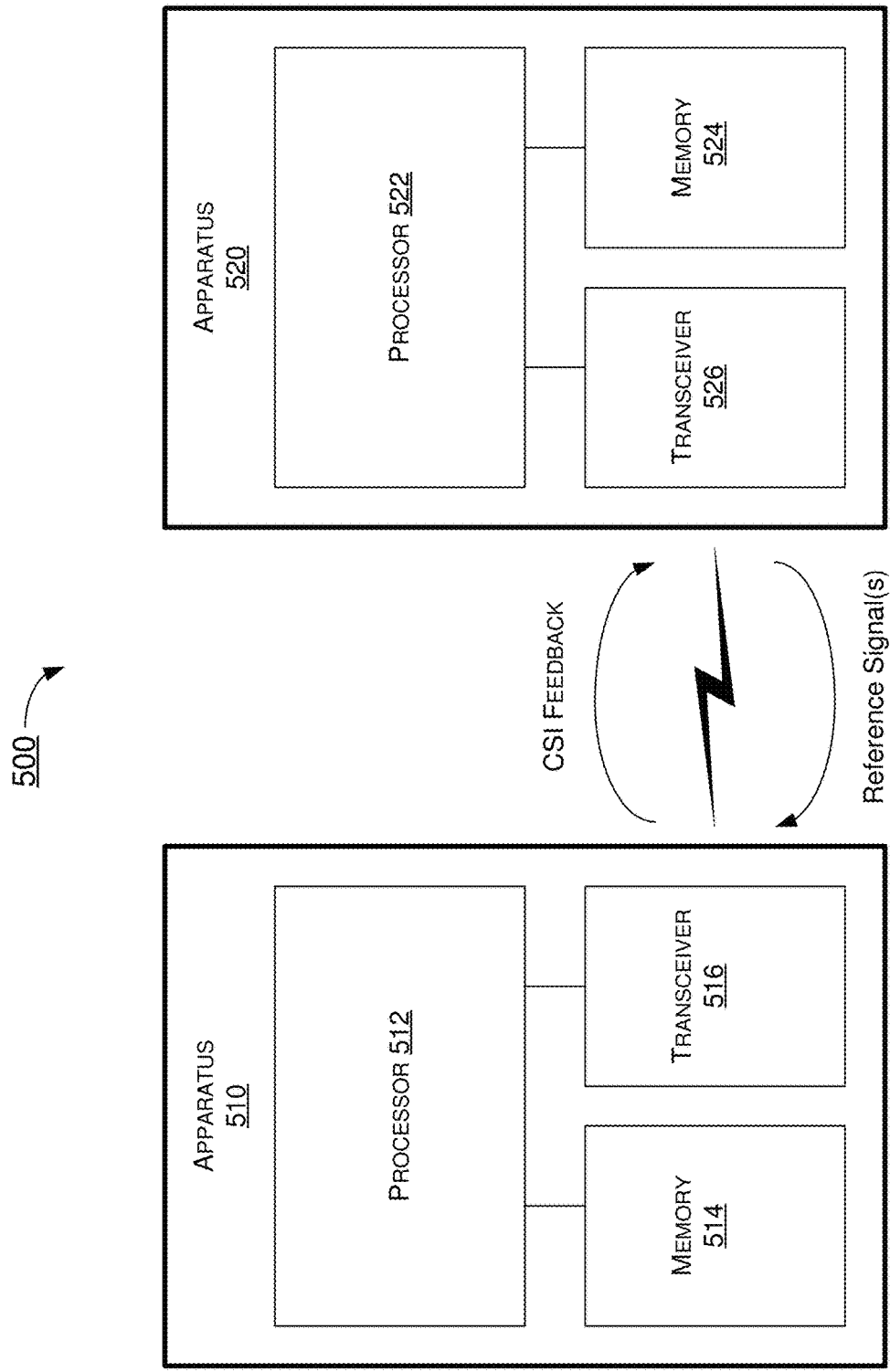
FIG. 5 is a diagram of an example communication environment in accordance with an implementation of the present disclosure.

FIG. 5 illustrates an example communication environment 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to enhanced Type II CSI in mobile communications, including the various schemes described above with respect to various proposed designs, concepts, schemes, systems and methods described above as well as process 600 described below.

Each of apparatus 510 and apparatus 520 may be a part of an electronic apparatus, which may be a network apparatus or a UE, such as a portable or mobile apparatus, a wearable apparatus, a wireless communication apparatus or a computing apparatus. For instance, each of apparatus 510 and apparatus 520 may be implemented in a smartphone, a smartwatch, a personal digital assistant, a digital camera, or a computing equipment such as a tablet computer, a laptop computer or a notebook computer. Each of apparatus 510 and apparatus 520 may also be a part of a machine type apparatus, which may be an Internet-of-Things (IoT) apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in an eNodeB in an LTE, LTE-Advanced or LTE-Advanced Pro network or in a gNB or TRP in a 5G network, an NR network or an IoT network.

In some implementations, each of apparatus 510 and apparatus 520 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 510 and apparatus 520 may be implemented in or as a network apparatus or a UE. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to enhanced Type II CSI in mobile communications in accordance with various implementations of the present disclosure.

In some implementations, apparatus 510 may also include a transceiver 516 coupled to processor 512. Transceiver 516 may be capable of wirelessly transmitting and receiving data for MU-MIMO. In some implementations, apparatus 520 may also include a transceiver 526 coupled to processor 522. Transceiver 526 may include a transceiver capable of wirelessly transmitting and receiving data for MU-MIMO.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (FeRAM), magnetoresistive RAM (MRAM) and/or phase-change memory.

For illustrative purposes and without limitation, a description of capabilities of apparatus 510 and apparatus 520 is provided below in the context of apparatus 510 functioning as a UE and apparatus 520 functioning as a network node (e.g., eNB, gNB or TRP) of a wireless network (e.g., a 5G NR network).

In one aspect of enhanced Type II CSI in mobile communications in accordance with the present disclosure, processor 512 of apparatus 510 (as a UE) may receive, via transceiver 516, from apparatus 520 (as a network node of a wireless network) one or more reference signals via a communication link between apparatus 510 and apparatus 520. Additionally, processor 512 may construct a precoder such that a number of selected beams for a plurality of delay taps is reduced. Moreover, processor 512 may construct a linear combination-based CSI feedback by utilizing the precoder such that overhead in the CSI feedback is reduced compared to a case in which the number of selected beams for the plurality of delay taps is not reduced. Furthermore, processor 512 may transmit, via transceiver 616, the CSI feedback to apparatus 520.

In some implementations, in constructing the precoder, processor 512 may perform a beam selection for each of the plurality of delay taps.

In some implementations, in performing the beam selection for each of the plurality of delay taps, processor 512 may perform certain operations. For instance, processor 512 may convert a frequency-domain representation of a plurality of beams into a time-domain representation of the plurality of beams at each delay tap using DFT. Additionally, processor 512 may select one or more strong taps from a plurality of delay taps, based on a time-domain component thereof, and one or more strong linear combination coefficients from a plurality of linear combination coefficients. Moreover, processor 512 may perform amplitude quantization of the selected one or more strong linear combination coefficients to result in amplitude normalization per polarization. In some implementations, in selecting, processor 512 may select through a bitmap.

In some implementations, in performing the beam selection for each of the plurality of delay taps, processor 512 may perform the beam selection such that different delay taps of the plurality of delay taps have different numbers of beams selected. In such cases, a sequence of a respective number of selected beams for each of the plurality of delay taps may constitute a beam number profile.

In some implementations, each of the plurality of delay taps may be associated with a respective tap index such that the respective tap index of each of the plurality of delay taps is different from one or more other respective tap indices of one or more other delay taps of the plurality of delay taps. Moreover, the respective number of selected beams for each of the plurality of delay taps may vary with the respective tap index.

In some implementations, the beam number profile may be specified in a 3GPP specification (e.g., Rel-16 of the 3GPP specification for NR). Alternatively, or additionally, the beam number profile may be configured by apparatus 520. Alternatively, or additionally, the beam number profile may be determined by processor 512.

In some implementations, in constructing the precoder, processor 512 may construct a rank R precoder at frequency f as follows:

$$\sum_{d=1}^{D} e^{j2\pi f \tau_d} \times B \times S_d \times P_d$$

In such cases, D may denote a number of delay taps included in the CSI feedback, with tap delay values $\{\tau_1, \tau_2, \ldots, \tau_D\}$. With $b_1, \ldots, b_L$ from orthogonal 2D DFT beams at a given $(o_1, o_2)$, $0 \leq o_1 \leq O_1-1$, $0 \leq o_2 \leq O_2-1$, a selected beam basis for all D delay taps may be expressed as $B_{M \times 2L}=$ $$B_{M \times 2L} = \begin{bmatrix} b_1 & \ldots & b_L & 0 & \ldots & 0 \\ 0 & \ldots & 0 & b_1 & \ldots & b_L \end{bmatrix}.$$

Additionally, $S_d$ may denote a 2L×$L_d$ beam selection matrix at tap d, with $S_d$ having elements from "1" and "0" and with a single "1" in each column and no more than one "1" in each row. Moreover, L may denote a number of 2D DFT beams at each delay tap, $L_d$ may denote a number of selected beam basis vectors at delay tap d, and $P_d$ may denote an $L_d$×R matrix for delay tap d.

Illustrative Processes

Figure 6:
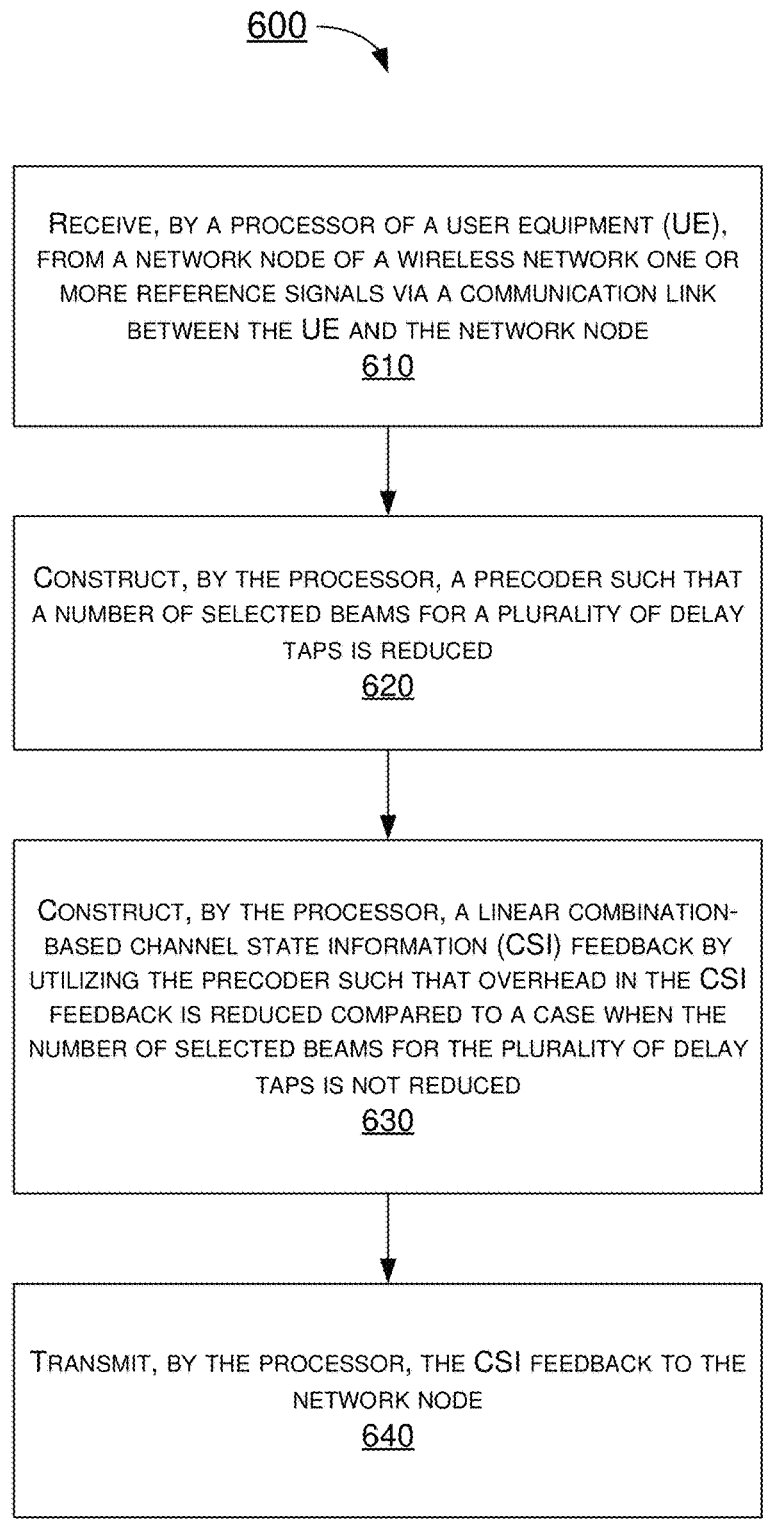
FIG. 6 is a flowchart of an example process in accordance with an implementation of the present disclosure.

FIG. 6 illustrates an example process 600 of wireless communication in accordance with an implementation of the present disclosure. Process 600 may represent an aspect of implementing the proposed concepts and schemes such as those described above. More specifically, process 600 may represent an aspect of the proposed concepts and schemes pertaining to enhanced Type II CSI in mobile communications. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more blocks of process 600 may be iterated. Process 600 may be implemented by communications system 500 and any variations thereof. Solely for illustrative purposes and without limiting the scope, process 600 is described below in the context of apparatus 510 being implemented in or as a UE and apparatus 520 being implemented in or as a network node of a wireless network (e.g., a 5G NR network). Process 600 may begin at block 610.

At 610, process 600 may involve processor 512 of apparatus 510 (as a UE) receiving, via transceiver 516, from apparatus 520 (as a network node of a wireless network) one or more reference signals via a communication link between apparatus 510 and apparatus 520. Process 600 may proceed from 610 to 620.

At 620, process 600 may involve processor 512 constructing a precoder such that a number of selected beams for a plurality of delay taps is reduced. Process 600 may proceed from 620 to 630.

At 630, process 600 may involve processor 512 constructing a linear combination-based CSI feedback by utilizing the precoder such that overhead in the CSI feedback is reduced compared to a case in which the number of selected beams for the plurality of delay taps is not reduced. Process 600 may proceed from 630 to 640.

At 640, process 600 may involve processor 512 transmitting, via transceiver 616, the CSI feedback to apparatus 520.

In some implementations, in constructing the precoder, process 600 may involve processor 512 performing a beam selection for each of the plurality of delay taps.

In some implementations, in performing the beam selection for each of the plurality of delay taps, process 600 may involve processor 512 performing certain operations. For instance, process 600 may involve processor 512 converting a frequency-domain representation of a plurality of beams into a time-domain representation of the plurality of beams at each delay tap using DFT. Additionally, process 600 may involve processor 512 selecting one or more strong taps from a plurality of delay taps, based on a time-domain component thereof, and one or more strong linear combination coefficients from a plurality of linear combination coefficients. Moreover, process 600 may involve processor 512 performing amplitude quantization of the selected one or more strong linear combination coefficients to result in amplitude normalization per polarization. In some implementations, in selecting, process 600 may involve processor 512 selecting through a bitmap.

In some implementations, in performing the beam selection for each of the plurality of delay taps, process 600 may involve processor 512 performing the beam selection such that different delay taps of the plurality of delay taps have different numbers of beams selected. In such cases, a sequence of a respective number of selected beams for each of the plurality of delay taps may constitute a beam number profile.

In some implementations, each of the plurality of delay taps may be associated with a respective tap index such that the respective tap index of each of the plurality of delay taps is different from one or more other respective tap indices of one or more other delay taps of the plurality of delay taps. Moreover, the respective number of selected beams for each of the plurality of delay taps may vary with the respective tap index.

In some implementations, the beam number profile may be specified in a 3GPP specification (e.g., Rel-16 of the 3GPP specification for NR). Alternatively, or additionally, the beam number profile may be configured by apparatus 520. Alternatively, or additionally, the beam number profile may be determined by processor 512.

In some implementations, in constructing the precoder, process 600 may involve processor 512 constructing a rank R precoder at frequency f as follows:

$$\sum_{d=1}^{D} e^{j2\pi f \tau_d} \times B \times S_d \times P_d$$

In such cases, D may denote a number of delay taps included in the CSI feedback, with tap delay values $\{\tau_1, \tau_2, \ldots, \tau_D\}$. With $b_1, \ldots, b_L$ from orthogonal 2D DFT beams at a given $(o_1, o_2)$, $0 \leq o \leq O_1-1$, $0 \leq o_2 \leq O_2-1$, a selected beam basis for all D delay taps may be expressed as $B_{M \times 2L}=$ $$B_{M \times 2L} = \begin{bmatrix} b_1 & \ldots & b_L & 0 & \ldots & 0 \\ 0 & \ldots & 0 & b_1 & \ldots & b_L \end{bmatrix}.$$

Additionally, $S_d$ may denote a 2L×$L_d$ beam selection matrix at tap d, with $S_d$ having elements from "1" and "0" and with a single "1" in each column and no more than one "1" in each row. Moreover, L may denote a number of 2D DFT beams at each delay tap, $L_d$ may denote a number of selected beam basis vectors at delay tap d, and $P_d$ may denote an $L_d \times R$ matrix for delay tap d.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor of a user equipment (UE), from a network node of a wireless network one or more reference signals via a communication link between the UE and the network node;

constructing, by the processor, a precoder such that a number of selected beams for a plurality of delay taps is reduced;

constructing, by the processor, a linear combination-based channel state information (CSI) feedback by utilizing the precoder such that overhead in the CSI feedback is reduced compared to a case in which the number of selected beams for the plurality of delay taps is not reduced; and transmitting, by the processor, the CSI feedback to the network node, wherein the constructing of the precoder comprises performing a beam selection for each of the plurality of delay taps, wherein the performing of the beam selection for each of the plurality of delay taps comprises performing the beam selection such that different delay taps of the plurality of delay taps have different numbers of beams selected, and wherein a sequence of a respective number of selected beams for each of the plurality of delay taps constitutes a beam number profile.

2. The method of claim 1, wherein the performing of the beam selection for each of the plurality of delay taps comprises:

converting a frequency-domain representation of a plurality of beams into a time-domain representation of the plurality of beams at each delay tap using Discrete Fourier Transform (DFT);

selecting one or more strong taps from a plurality of delay taps, based on a time-domain component thereof, and one or more strong linear combination coefficients from a plurality of linear combination coefficients; and performing amplitude quantization of the selected one or more strong linear combination coefficients to result in amplitude normalization per polarization.

3. The method of claim 2, wherein the selecting comprises selecting through a bitmap.

4. The method of claim 1, wherein each of the plurality of delay taps is associated with a respective tap index such that the respective tap index of each of the plurality of delay taps is different from one or more other respective tap indices of one or more other delay taps of the plurality of delay taps, and wherein the respective number of selected beams for each of the plurality of delay taps varies with the respective tap index.

5. The method of claim 1, wherein the beam number profile is specified in a $3^{rd}$ Generation Partnership Project (3GPP) specification.

6. The method of claim 1, wherein the beam number profile is configured by the wireless network.

7. The method of claim 1, wherein the beam number profile is determined by the UE.

8. The method of claim 1, wherein the constructing of the precoder comprises constructing a rank R precoder at frequency f as follows:

$$\sum_{d=1}^{D} e^{j2\pi f \tau_d} \times B \times S_d \times P_d$$

wherein B denotes a selected beam basis,
wherein $S_d$ denotes a $2L \times L_d$ beam selection matrix at tap d, with $S_d$ having elements from "1" and "0" and with a single "1" in each column and no more than one "1" in each row,
wherein $P_d$ denotes an $L_d \times R$ matrix for delay tap d,
wherein R is either 1 or 2,
wherein D denotes a number of delay taps included in the CSI feedback, with tap delay values $\{\tau_1, \tau_2, \ldots, \tau_D\}$,
wherein, with $b_1, \ldots, b_L$ from orthogonal two-dimensional (2D) Discrete Fourier Transform (DFT) beams at a given $(o_1, o_2)$, $0 \leq o_1 \leq O_1 - 1$, $0 \leq o_2 \leq O_2 - 1$, a selected beam basis for all D delay taps is expressed as $$B_{M \times 2L} = \begin{bmatrix} b_1 & \ldots & b_L & 0 & \ldots & 0 \\ 0 & \ldots & 0 & b_1 & \ldots & b_L \end{bmatrix},$$

wherein L denotes a number of 2D DFT beams at each delay tap,
wherein $L_d$ denotes a number of selected beam basis vectors at delay tap d.

9. An apparatus implemented in a user equipment (UE), comprising:
a transceiver configured to wirelessly communicate with a network node of a wireless network; and
a processor coupled to the transceiver and configured to perform operations comprising:
receiving, via the transceiver, from the network node one or more reference signals via a communication link between the UE and the network node;
constructing a precoder such that a number of selected beams for a plurality of delay taps is reduced;
constructing a linear combination-based channel state information (CSI) feedback by utilizing the precoder such that overhead in the CSI feedback is reduced compared to a case in which the number of selected beams for the plurality of delay taps is not reduced; and
transmitting, via the transceiver, the CSI feedback to the network node,
wherein, in constructing the precoder, the processor is configured to perform a beam selection for each of the plurality of delay taps,
wherein, in performing the beam selection for each of the plurality of delay taps, the processor is configured to perform the beam selection such that different delay taps of the plurality of delay taps have different numbers of beams selected, and
wherein a sequence of a respective number of selected beams for each of the plurality of delay taps constitutes a beam number profile.

10. The apparatus of claim 9, wherein, in performing the beam selection for each of the plurality of delay taps, the processor is configured to perform operations comprising:
converting a frequency-domain representation of a plurality of beams into a time-domain representation of the plurality of beams at each delay tap using Discrete Fourier Transform (DFT);
selecting one or more strong taps from a plurality of delay taps, based on a time-domain component thereof, and one or more strong linear combination coefficients from a plurality of linear combination coefficients; and
performing amplitude quantization of the selected one or more strong linear combination coefficients to result in amplitude normalization per polarization.

11. The apparatus of claim 10, wherein, in selecting, the processor is configured to select through a bitmap.

12. The apparatus of claim 9, wherein each of the plurality of delay taps is associated with a respective tap index such that the respective tap index of each of the plurality of delay taps is different from one or more other respective tap indices of one or more other delay taps of the plurality of delay taps, and wherein the respective number of selected beams for each of the plurality of delay taps varies with the respective tap index.

13. The apparatus of claim 9, wherein the beam number profile is specified in a $3^{rd}$ Generation Partnership Project (3GPP) specification.

14. The apparatus of claim 9, wherein the beam number profile is configured by the wireless network.

15. The apparatus of claim 9, wherein the beam number profile is determined by the UE.

16. The apparatus of claim 9, wherein, in constructing the precoder, the processor is configured to construct a rank R precoder at frequency f as follows:

$$\sum_{d=1}^{D} e^{j2\pi f \tau_d} \times B \times S_d \times P_d$$

wherein B denotes a selected beam basis,
wherein $S_d$ denotes a $2L \times L_d$ beam selection matrix at tap d, with $S_d$ having elements from "1" and "0" and with a single "1" in each column and no more than one "1" in each row,
wherein $P_d$ denotes an $L_d \times R$ matrix for delay tap d,
wherein R is either 1 or 2,
wherein D denotes a number of delay taps included in the CSI feedback, with tap delay values $\{\tau_1, \tau_2, \ldots, \tau_D\}$, wherein, with $b_1, \ldots, b_L$ from orthogonal two-dimensional (2D) Discrete Fourier Transform (DFT) beams at a given $(o_1, o_2)$, $0 \leq o_1 \leq O_1-1$, $0 \leq o_2 \leq O_2-1$, a selected beam basis for all D delay taps is expressed as $$B_{M \times 2L} = \begin{bmatrix} b_1 & \ldots & b_L & 0 & \ldots & 0 \\ 0 & \ldots & 0 & b_1 & \ldots & b_L \end{bmatrix},$$

wherein L denotes a number of 2D DFT beams at each delay tap, wherein $L_d$ denotes a number of selected beam basis vectors at delay tap d.

* * * * *